United States Patent [19]

Turetsky

[11] 4,107,047

[45] Aug. 15, 1978

[54] FILTER-PURIFIER CARTRIDGE

[76] Inventor: Isadore Turetsky, 23940 Welby Way, Los Angeles, Calif. 91307

[21] Appl. No.: 771,777

[22] Filed: Feb. 24, 1977

[51] Int. Cl.² .......................................... B01D 27/00
[52] U.S. Cl. ................................... 210/337; 210/450
[58] Field of Search ............... 210/335, 337, 338, 339, 210/342, 437, 450, 451, 457, 458, 295, 315

[56] References Cited

U.S. PATENT DOCUMENTS

| 2,781,912 | 2/1957 | Newcum | 210/295 |
|---|---|---|---|
| 2,904,182 | 9/1959 | Baumann | 210/458 X |
| 3,132,501 | 5/1964 | Jacobs et al. | 210/335 X |
| 3,262,570 | 7/1966 | Gailitis et al. | 210/315 X |
| 3,300,051 | 1/1967 | Mitchell | 210/339 |
| 3,357,563 | 12/1967 | Sicard | 210/315 X |
| 3,467,256 | 9/1969 | Humbert, Jr. et al. | 210/338 X |

*Primary Examiner*—William A. Cuchlinski, Jr.

[57] ABSTRACT

A filter-purifier cartridge arranged so that a self contained tubular purifying element is inserted within the hollow core of a tubular filter; the inlet and outlet passages of the purifying element arranged to permit axial flow through the hollow core containing the purifying medium of said element, in combination with radial flow through the tubular filter.

4 Claims, 2 Drawing Figures

FILTER-PURIFIER CARTRIDGE

FIELD OF THE INVENTION

This invention relates to a filter and purifier cartridge, and since it finds particular utility in the field of water filtration and purification, embodiments thereof adapted for such use are hereinafter described as illustrative of the invention and the advantages thereof, it being understood that my invention is not restricted to such use.

There is a growing demand for an inexpensive filter element that can be periodically discarded, and a relatively economical purifying element which can be used in combination with the aforementioned filter. Both the efficiency and filter life depend on the mass of purifying material used, and the surface area of the filter. The difficulty arises from the fact that in the present type of radial flow filter-purifier cartridges the fluid does not flow uniformly through the entire volume of the purifying medium, whereas in an axial flow filter-purifier cartridge the relatively small surface area used for filtration of the fluid decreases the life expectancy of the filter.

OBJECTS OF THE INVENTION

An object of my invention is to provide a water filter-purifier cartridge consisting of separable purifier and filter elements which can be removed when purifying or filtering efficiency is impaired, and replaced accordingly.

Another object of my invention is the provision for recharging the purifier element with new purifying medium resulting in a marked savings as compared to a throw-away unit.

Still another object of my invention is to combine the efficiency offered by a radial flow through the filter with an axial flow within the purifier element.

An embodiment of my invention capable of accomplishing the foregoing objects and providing the advantages contemplated by them and other advantages is described in the following specification which may be more readily understood by reference to the accompanying drawings.

DETAILED DESCRIPTION OF THE DRAWINGS

Figure 2:
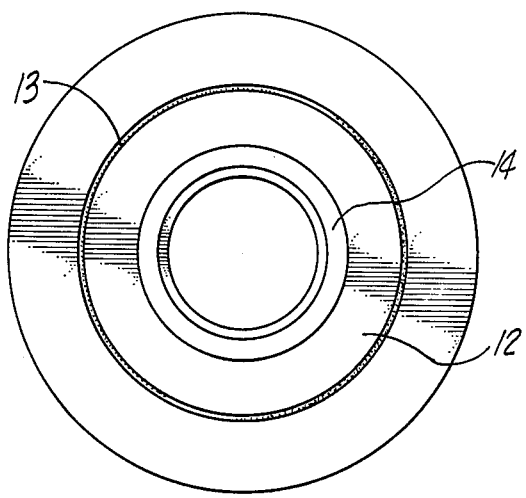
FIG. 2 is a plan view of the embodiment.
Figure 1:
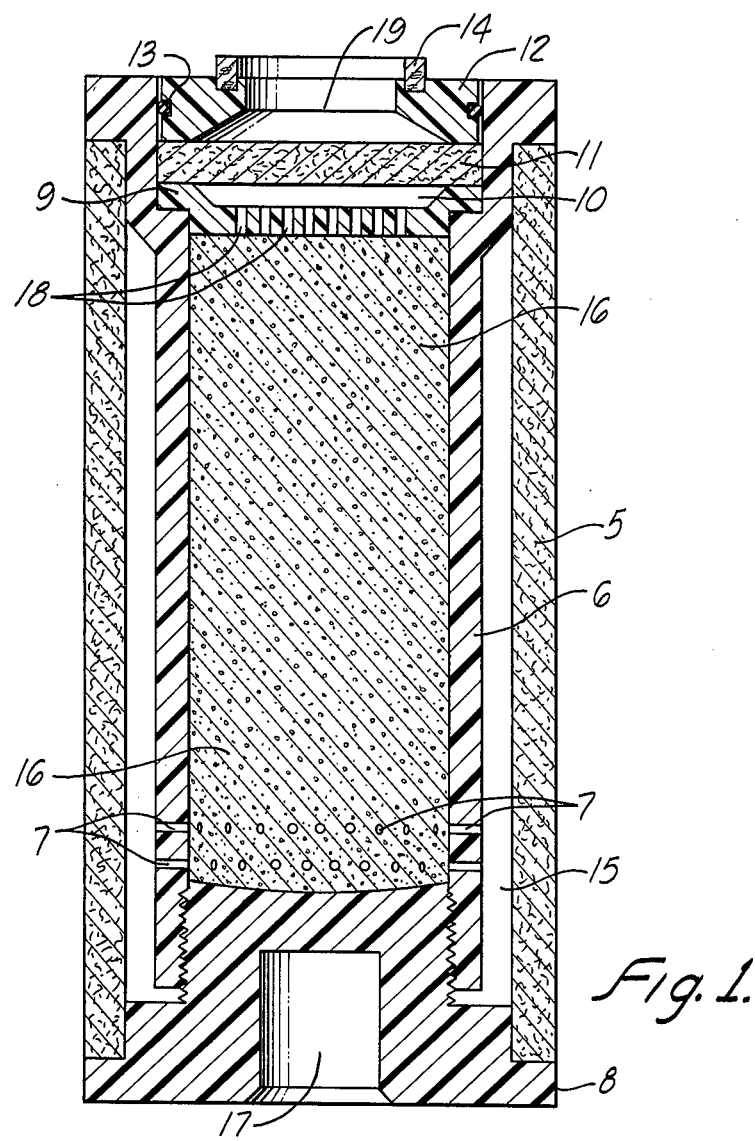
FIG. 1 is a side elevation sectional view of a filter-purifier cartridge embodying the invention.

Referring to FIG. 1 which is for illustrative purposes only, the numeral 5 indicates a permeable porous tubular filter having a hollow core, with one end of said tubular filter resting against the outside flange at the concentrically enlarged end section of hollow cylinder 6, said hollow cylinder 6 being inserted into the hollow core of the tubular filter 5. The unexpanded section of cylinder 6 is spaced from the sidewall of tubular filter 5 to form the annular space 15. The interior of cylinder 6 containing the purifying medium 16 communicates with the annular space 15 by means of perforations 7 which are circumferentially disposed near the unexpanded end of said hollow cylinder 6, the section between the perforations 7 and said unexpanded end being internally threaded. A flanged hollow step-type adapter plug 8 which is screwed into the threaded end of cylinder 6 positions, and seals said threaded end of a hollow cylinder 6 and the adjacent end of tubular filter 5; the perforations 7 remaining exposed so that the interior of the hollow cylinder 6 communicates with annular space 15. The threaded hollow plug 8 will also transmit any axial stress through the hollow cylinder 6 and tubular filter 5. The purifying medium is contained within the hollow core of cylinder 6 by means of the flanged, hollow step-type plug 8 having a circular recess 17, and the perforated disk 9 which has an offset rimmed section resting against the shoulder within the enlarged interior section of hollow cylinder 6. The circular recess 17 can be used to center the cartridge in its housing. A permeable porous disk 11 rests against the offset rimmed section of the perforated disk 9 to form chamber 10. A cylinder sealing ring 12 containing an "O" ring 13 wihin a continuous groove in said sealing ring 12 is inserted into the enlarged hollow core of the expanded section of cylinder 6 and rests against the permeable porous disk 11, the "O" ring seal 13 preventing any leakage between the outer wall of sealing ring 12 and the inner wall of enlarged section of cylinder 6. A ring gasket 14 is positioned atop sealing ring 12 and around the exit port 19 of the cartridge.

In operation the filter-purifier cartridge as shown is subjected to axial compression after said cartridge is inserted into its housing. The cartridge housing is not part of my invention and is not shown. It will be evident that, while the filter housing is not illustrated, one skilled in the art can easily adapt the illustrated cartridge to a hollow cylindrical housing having axially aligned inlet and outlet passages. One skilled in the art will also note that embodiments of the cartridge as shown, are adapted to a common type of filter housing which is screwed onto a double ported end section containing an "O" ring to seal the single open end of said housing.

With the filter-purifier cartridge assembled as illustrated, water to be filtered and purified flows radially through the permeable porous tubular filter 5 and enters the annular space 15. The water then enters the hollow core of cylinder 6 through the radial perforations 7, said perforations disposed above the inserted end of the flanged, threaded step-type plug 8 which seals said hollow core at the threaded end section of cylinder 6, and the adjacent end of the tubular filter 5. The water then flows axially through the hollow core of cylinder 6 containing the purifying medium 16 and enters chamber 10 by means of perforations 18 in disk 9. Water then flows through the permeable porous disk 11 and exits at discharge port 19, said discharge port communicating with the discharge passage of the cartridge housing. The gasket 14 surrounding the cartridge discharge port 19 and the cartridge housing discharge passage prevents any unprocessed water from being discharged through said cartridge housing discharge passage.

The present invention contemplates an alternate embodiment which can include a reticulated core having a fiber winding as the tubular filter. Similarly, a perforated core being wound with fiber or having a pleated resin impregnated filter paper formed around said core can be used as a tubular filter.

While the embodiments of this invention hereinbefore illustrated and described are fully capable of performing the objects and accomplishing the advantages primarily started, it will be understood that this invention is not restricted to the specific embodiments hereinafter set forth but includes all modifications coming within the scope of the claims that follow.

I claim:

1. A filter-purifier cartridge for liquids adapted to be inserted in a filter apparatus, comprising: a tubular purifier element containing a purifying medium within its hollow core, said tubular element being concentrically enlarged at one end section, an internal shoulder within, an outlet passage, and an external flange at said enlarged end section; a perforated disk inserted and contained against said internal shoulder by a similarly inserted permeable porous disk and a sealing ring within the hollow core of said enlarged tubular section, and circumferentially disposed perforations at the opposite unexpanded internally threaded end section of said tubular purifier element; said tubular purifier element inserted into the hollow core of a tubular filter, one end of said tubular filter being sealed and positioned by the flange and enlarged circumferential end section of the tubular purifier element; the unexpanded section of said tubular purifier element being spaced from the sidewall of the tubular filter by means of a flanged, threaded, hollow step-type plug, the threaded section of said step-type plug being inserted into the internally threaded end section of said tubular purifier element, the adjacent end of said tubular filter being sealed and positioned by the unthreaded section and flange of said hollow step-type plug; a purifying medium contained within the hollow core of said purifier element between the perforated disk resting against the internal shoulder of the expanded end section of said purifier element, and said hollow step-type plug; said hollow core of the purifier element communicating with the annular space between the positioned tubular filter and said purifier element by means of the circumferentially disposed perforations in said tubular purifier element.

2. The invention defined in claim 1, in which a frictional seal is disposed between the sealing ring and the enlarged end section of the tubular purifier element.

3. The invention defined in claim 1, in which the exposed end of the sealing ring contain a frictional seal surrounding the port of said sealing ring.

4. The invention defined in claim 1, wherein a chamber exists between the permeable porous disk an the perforated disk which are inserted in the enlarged tubular section of the purifier element.

* * * * *